(12) United States Patent
Nakao et al.

(10) Patent No.: US 8,238,843 B2
(45) Date of Patent: Aug. 7, 2012

(54) STRAP ATTACHING SECTION OF FOLDING PORTABLE APPARATUS, AND METHOD FOR MANUFACTURING THE STRAP ATTACHING SECTION

(75) Inventors: Junichi Nakao, Tokyo (JP); Toshiki Yamanaka, Shizuoka (JP); Yasuyuki Homma, Shizuoka (JP)

(73) Assignee: Nec Corporation, Tokyo (JP)

( * ) Notice: Subject to any disclaimer, the term of this patent is extended or adjusted under 35 U.S.C. 154(b) by 340 days.

(21) Appl. No.: 12/449,394

(22) PCT Filed: Feb. 7, 2008

(86) PCT No.: PCT/JP2008/052014
§ 371 (c)(1),
(2), (4) Date: Aug. 6, 2009

(87) PCT Pub. No.: WO2008/096810
PCT Pub. Date: Aug. 14, 2008

(65) Prior Publication Data
US 2011/0016677 A1    Jan. 27, 2011

(30) Foreign Application Priority Data
Feb. 7, 2007    (JP) ................. 2007-028056

(51) Int. Cl.
G06F 1/20 (2006.01)
H05K 5/00 (2006.01)
H05K 7/20 (2006.01)
B25G 1/04 (2006.01)
H04B 1/38 (2006.01)
H04M 1/00 (2006.01)

(52) U.S. Cl. .............. 455/90.3; 361/679.59; 16/428; 455/575.3; 455/575.1

(58) Field of Classification Search ............. 312/223.2; 455/90.3, 575.1, 575.3, 575.4, 575.8, 550.1; 361/679.57, 679.3; 24/457, 458; 16/428, 16/436
See application file for complete search history.

(56) References Cited

U.S. PATENT DOCUMENTS 6,094,566 A * 7/2000 Dasent et al. .............. 455/575.6
6,513,199 B1 * 2/2003 Cheng ....................... 16/436
6,715,938 B2 * 4/2004 Takanashi ................... 396/349
(Continued)

FOREIGN PATENT DOCUMENTS
JP    5-191057    7/1993
JP    6-152462    5/1994
JP    2002-016370    1/2002
(Continued)

Primary Examiner — Darnell Jayne
Assistant Examiner — Andrew Roersma
(74) Attorney, Agent, or Firm — McGinn IP Law Group, PLLC

(57) ABSTRACT

A strap attaching section of a folding portable apparatus includes a recessed section arranged on a hinge section of a case configuring the portable apparatus, a strap holder stored in the recessed section, and a coupler for coupling the strap holder and the hinge section. The coupler includes a first pin hole which penetrates the strap holder, a second pin hole formed on the hinge section, a groove formed on an outer surface of the hinge section, and a pin. The groove is provided with a first region whereupon one end of the second pin hole opens, and a second region continued to the first region. A first portion of the pin extends through the first and second pin holes, and a second portion of the pin is arranged in the second region in the groove. A cover is removably attached to the case to cover the groove.

20 Claims, 6 Drawing Sheets

U.S. PATENT DOCUMENTS

| | | | |
|---|---|---|---|
| 6,880,796 B2* | 4/2005 | Khor et al. | 248/677 |
| 7,596,358 B2* | 9/2009 | Takagi | 455/90.3 |
| 2001/0019946 A1* | 9/2001 | Okuda | 455/90 |
| 2002/0080560 A1* | 6/2002 | Flegeo | 361/600 |
| 2007/0004474 A1* | 1/2007 | Oota et al. | 455/575.3 |
| 2007/0077971 A1* | 4/2007 | Tu et al. | 455/575.3 |

FOREIGN PATENT DOCUMENTS

| | | |
|---|---|---|
| JP | 2002-271460 | 9/2002 |
| JP | 2004-153450 | 5/2004 |
| JP | 2005-303599 | 10/2005 |
| JP | 2005-347884 | 12/2005 |
| WO | WO 2007/023848 A | 3/2007 |

* cited by examiner

FIG. 8  RELATED ART
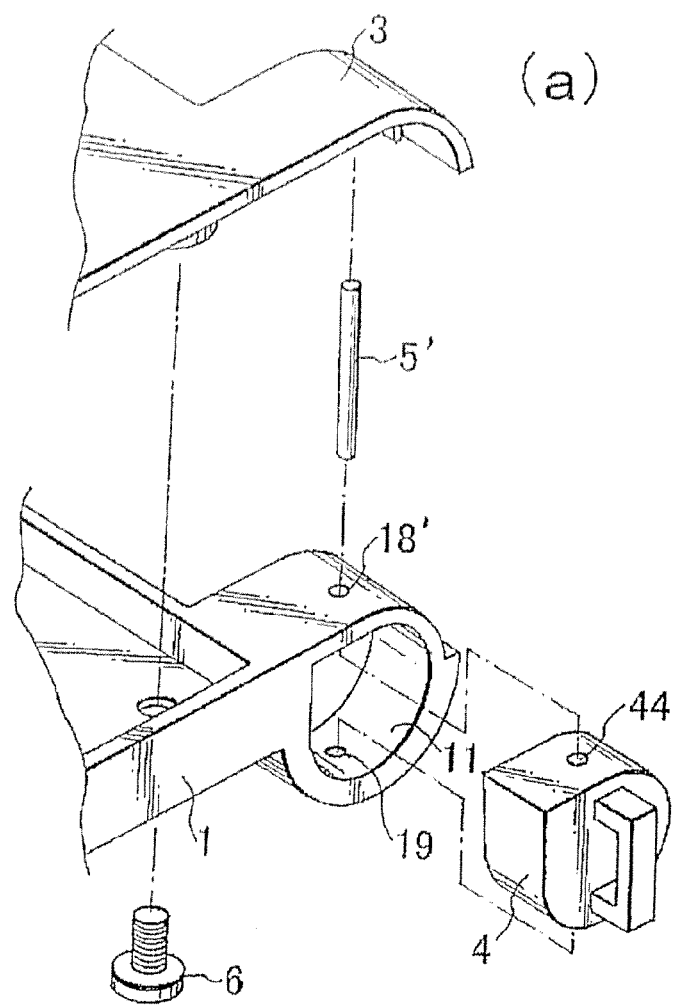
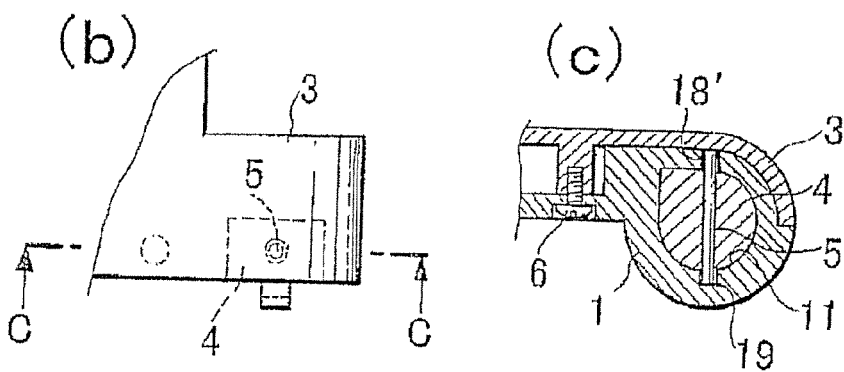

STRAP ATTACHING SECTION OF FOLDING PORTABLE APPARATUS, AND METHOD FOR MANUFACTURING THE STRAP ATTACHING SECTION

TECHNICAL FIELD

The present invention relates to the technical field of a folding portable apparatus that has a strap attaching section, and more particularly to the strap attaching section (its structure in particular) of the folding portable apparatus and a method of manufacturing the same. Examples of the folding portable apparatus include a folding portable electronic apparatus such as a folding portable communication terminal like a folding cellular phone.

BACKGROUND ART

Portable apparatuses including portable electronic apparatuses such as cellular phones and other portable communication terminals are equipped with straps for hanging and supporting the main bodies of the apparatuses. Straps may include various devices for both functional and design purposes. Such a strap may be attached to the casing of an apparatus through a through hole that is formed in the casing by integrally molding, but with problems in terms of miniaturization, low profile, and resin moldability. It has thus been common practice to prepare a strap holder (hereinafter, also referred to simply as "holder") having a through hole as an additional part and attach the part to the casing. If the casing is substantially rectangular in shape, attaching the strap holder to a corner of the casing facilitates pulling the apparatus body out of a pocket or bag without much interference. This is also preferable in terms of miniaturization, low profile, and appearance of the portable apparatus.

JP-A-05-191057 [Patent Document 1] discloses an example of a portable apparatus in which a strap holder is attached to a corner of the casing. FIG. 7 is a diagram showing the portable apparatus described in Patent Document 1, having a strap holder attached to its casing.

In FIG. 7, an upper casing 101 and a lower casing 102 are assembled with a printed circuit board 103 interposed therebetween. A strap holder 106 is composed of a protruding section 108 having a hole 108a, and a fitting section 107 having a fitting hole 107a. The apparatus body of substantially rectangular shape formed by the upper casing 101 and the lower casing 102 has an opening 102a in a corner, where a screw 109 is inserted into a through hole 104a in a protrusion 104 of the lower casing 102 and threadedly engaged with a screw hole in a protrusion 105 of the upper casing 101 via the fitting hole 107a of the strap holder 106. The strap holder 106 is thereby fixed to the casing.

Now, widespread models of portable apparatuses have a casing on which operation keys are arranged and another casing on which a screen for display such as liquid crystal display is arranged, the casings being rotatably assembled via a hinge. Such clamshell folding portable apparatuses have been made low profile recently, with limited locations to attach a strap to. When attaching a strap holder to a corner of the casing of a clamshell folding portable apparatus, it is advantageous to attach the strap holder structurally to a hinge cylinder section (hinge section) of the casing, which has a relatively large thickness in shape.

In Japanese Patent Application No. 2005-244827 filed with Japan Patent Office prior to Japanese Patent Application No. 2007-28056 which is the basic application of the priority claimed in this application, the applicant proposed to fix a strap holder part to a hinge section by using a pin. Note that Japanese Patent Application No. 2005-244827 is the basic application of the priority claimed in International Application PCT/JP2006/316480, and International Application PCT/JP2006/316480 was internationally published under WO 2007/023848 [Patent Document 2] after the filing date of Japanese Patent Application No. 2007-28056.

FIG. 8 is a diagram showing an example of the strap attaching section according to Patent Document 2, where FIG. 8(a) is an exploded perspective view, FIG. 8(b) is a top view, and FIG. 8(c) is a cross-sectional view taken along the line C-C of FIG. 8(b).

In FIGS. 8(a) to 8(c), the clamshell folding portable apparatus has a first casing (hereinafter, referred to simply as "casing") 1 and a cover 3 to be attached thereto. The portable apparatus also has a second casing (not shown) to be attached to the first casing via a hinge. The strap attaching section lies in a hinge cylinder section that constitutes the hinge for coupling the two casings. A strap holder 4 is accommodated in a recess 11 which is formed in the hinge cylinder section of the casing 1. A straight-shaped pin 5', which functions as a retaining pin of the holder 4, is inserted into a pin path 18' which is formed in the hinge cylinder section of the casing 1, a first pin hole 44 which is formed in the holder 4, and a pin recess 19 which is formed in the hinge cylinder section of the casing 1. The holder 4 and the pin 5' are thereby locked by the pin path 18' and the pin recess 19. The cover 3, which also functions as a retainer of the pin 5', is attached to the casing 1 with a screw 6. This configuration fixes the holder 4 with the pin 5' so as not to come out of the casing 1.

This strap attaching section can provide a sufficient strength even in smaller size, has excellent designability, and facilitates assembly because of the pin fixation.

Patent Document 1: JP-A-05-191057
Patent Document 2: WO 2007/023848

DISCLOSURE OF THE INVENTION

Problems to be Solved by the Invention

The portable apparatus having the strap holder described in Patent Document 1, however, is not a folding portable apparatus, and therefore is not a realization of the attachment of the strap holder to a hinge section.

With the strap attaching section of Patent Document 2, the holding section (hinge cylinder section) of the casing 1 where the pin path 18' and the pin recess 19 are formed needs to be thick in order to hold the pin 5' firmly so as not to come off. There has thus been the problem that the apparatus increases in thickness. For low-profile apparatuses, it is therefore necessary to adhere or press fit the pin 5' to the casing so as to secure the strength for the casing 1 to hold the pin 5' with. This has caused the problems of increased manufacturing costs and a need for dedicated equipment. The adhesion and press fitting have also had the problem that the casing needs to be broken and disassembled for repair, and the parts cannot be used again.

It is thus an object of the present invention to provide a strap attaching section that fixes a strap holder firmly to the casing of a folding portable apparatus with compact configuration, allows easy assembly and disassembly, and allows a reduction in manufacturing and repair costs. Another object of the present invention is to provide a method of manufacturing such a strap attaching section.

Means for Solving the Problems

To achieve any of the foregoing objects, according to the present invention, there is provided a strap attaching section of a folding portable apparatus, comprising:

a recess formed in a hinge section of a casing that constitutes the folding portable apparatus;

a strap holder accommodated in the recess; and a coupling member for coupling the strap holder and the hinge section, wherein the coupling member includes a first pin hole penetrating through the strap holder, a second pin hole formed in the hinge section, a groove formed in an outer surface of the hinge section, and an L-shaped pin, the second pin hole communicates with the groove, a first portion of the L-shaped pin extends through the first and second pin holes, and a second portion of the L-shaped pin is placed in the groove, and a cover for covering the groove is detachably attached to the casing.

According to the strap attaching section of the present invention, the first portion of the L-shaped pin is inserted into the first and second pin holes through the strap holder from the side of the groove in the hinge section, the second portion of the L-shaped pin is rotated about the longitudinal direction of the first portion and placed in the groove, and the cover is attached to the casing so as to cover the groove. This can easily restrain the L-shaped pin from rotation and prevent the same from coming off.

To achieve any of the foregoing objects, according to the present invention, there is provided a method of manufacturing the above strap attaching section of a folding portable apparatus, the method comprising the steps of:

accommodating the strap holder into the recess formed in the hinge section of the casing;

inserting the first portion of the L-shaped pin into the first and second pin holes from the groove formed in the outer surface of the hinge section;

rotating the second portion of the L-shaped pin about a longitudinal direction of the first portion to place the second portion in the groove; and detachably attaching the cover to the casing so as to cover the groove.

According to the present invention, there is also provided a folding portable apparatus comprising: the above strap attaching section; and another casing to be hinge-coupled with the casing.

Advantageous Effect of the Invention

According to the present invention, there is provided a strap attaching section that fixes the strap holder firmly to the casing with compact configuration, allows easy assembly and disassembly, and allows a reduction in manufacturing and repair costs.

BRIEF DESCRIPTION OF THE DRAWINGS

FIG. 8 is a diagram showing an example of a strap attaching section described in Patent Document 2, wherein (a) is an exploded perspective view, (b) a top view, and (c) a cross-sectional view taken along the line C-C of (b).

BEST MODE FOR CARRYING OUT THE INVENTION

Next, exemplary embodiments of the present invention will be described with reference to the drawings.

First Exemplary Embodiment

Figure 1:
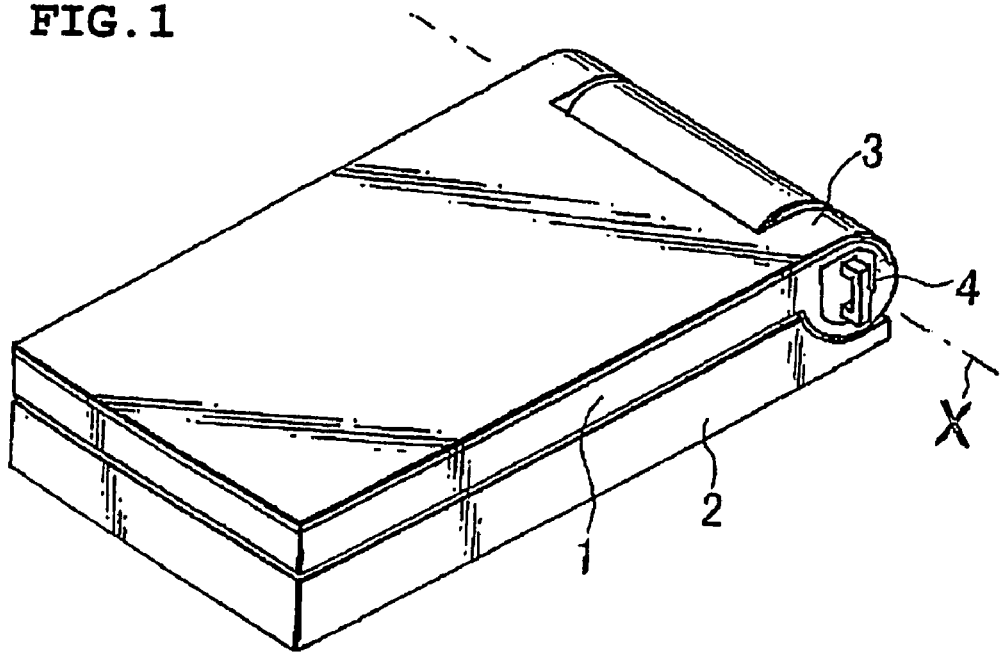
FIG. 1 is a perspective view showing a first exemplary embodiment of a folding portable apparatus that has a strap attaching section according to the present invention.

FIG. 1 is a perspective view showing a first exemplary embodiment of a folding portable apparatus that has a strap attaching section according to the present invention. In the exemplary embodiment, an end of a casing 1 of substantially rectangular shape and an end of another casing 2 of substantially rectangular shape are hinge-coupled with each other. That is, the folding portable apparatus of the exemplary embodiment has an additional casing 2 which is hinge-coupled with the casing 1. The rotation axis of the hinge will be denoted by X. The hinge coupling section (or hinge section) between the casings 1 and 2 has a substantially cylindrical shape with X at the center, and is also called a hinge cylinder section. The "hinge coupling section," "hinge section," or "hinge cylinder section" is configured to include portions of both the casings 1 and 2. As employed herein, the portions of each casing 1 or 2 will also be referred to as a "hinge coupling section," "hinge section," or "hinge cylinder section."

A cover 3 is attached to the casing 1. Functional units such as electronic circuit units that constitute electronic circuits and communication circuits are accommodated in a recess in the main section of the casing 1, and are covered with the cover 3. A strap holder 4 is attached to a hinge section 1' of the casing 1.

The exemplary embodiment relates to the structure of a strap attaching section of a folding portable apparatus, characterized in that: a strap holder is accommodated in a recess or recessed section in a side of the hinge cylinder section of a casing; an L-shaped pin is inserted through an opening formed in the casing and a pin hole penetrating through the strap holder, and is received by a receptor groove formed in the casing; a cover fastened to the casing holds down both sides of the pin to fix the strap holder.

The exemplary embodiment also relates to the structure of the strap attaching section of the folding portable apparatus, characterized in that: the pin is inserted obliquely with respect to a surface of the casing of flat shape; an extremity of the pin is held down by a rib formed on the cover; and a bottom of the pin is fitted into a lateral groove communicating with the opening and is held down by the cover.

Figure 2:
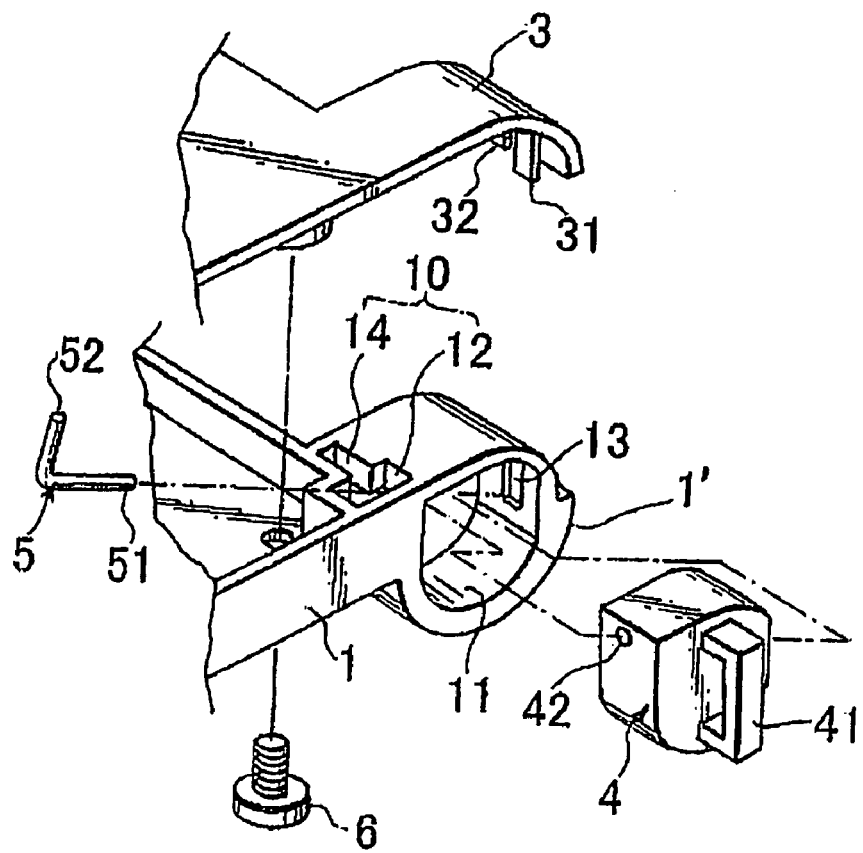
FIG. 2 is an exploded perspective view showing the strap attaching section according to the exemplary embodiment of FIG. 1.
Figure 3:
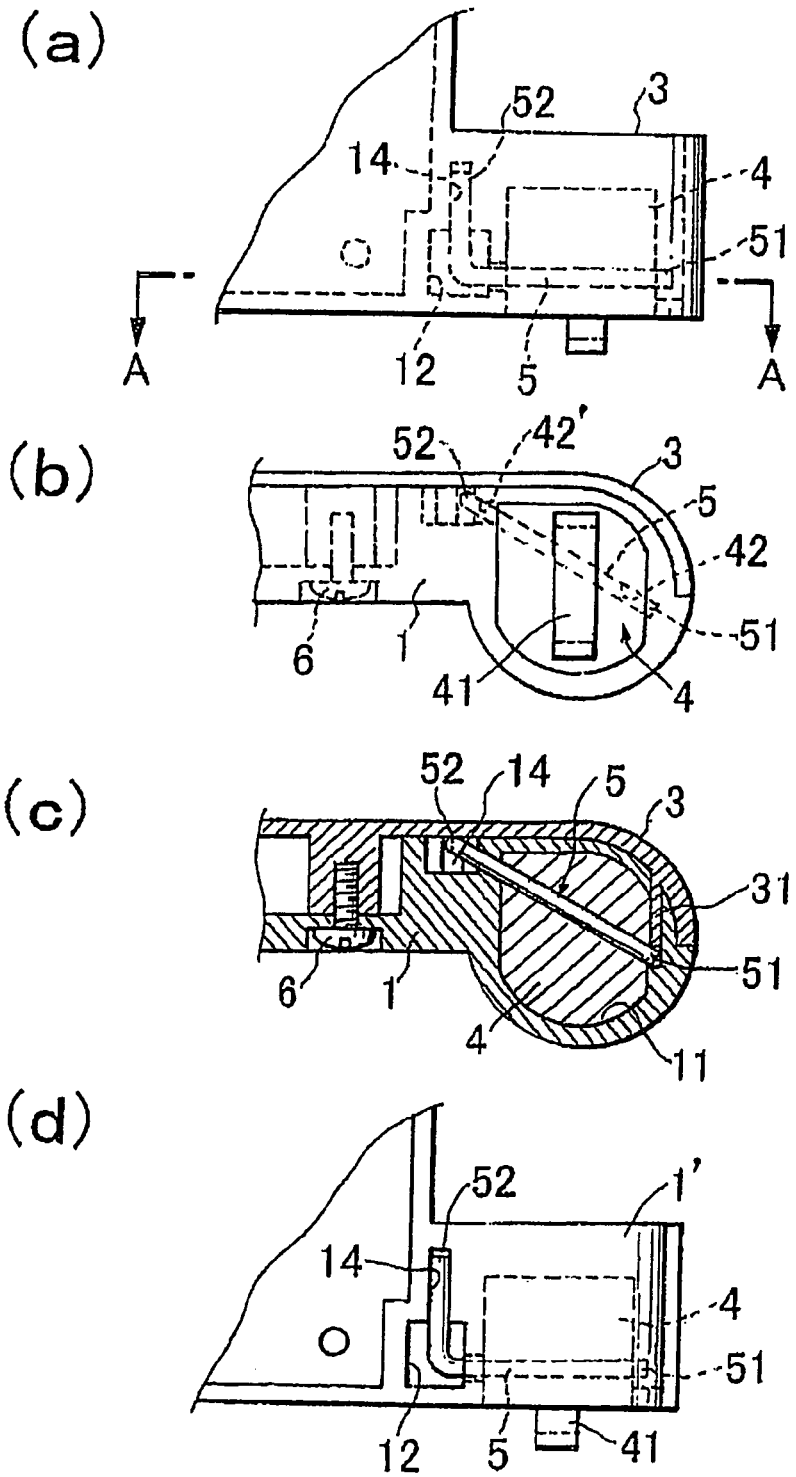
FIG. 3 is a diagram showing how the strap attaching section of the exemplary embodiment of FIG. 1 is assembled, wherein (a) is a top view, (b) a side view, (c) a cross-sectional view taken along the line A-A of (a), and (d) a top view with the cover removed.

FIG. 2 is an exploded perspective view showing a strap holder attaching section according to the exemplary embodiment. FIG. 3 is a diagram showing how the strap attaching section according to the exemplary embodiment is assembled, wherein (a) is a top view, (b) a side view, (c) a cross-sectional view taken along the line A-A of (a), and (d) a top view with the cover 3 removed.

In FIG. 2, the holder 4 is accommodated in a recess 11 which is formed in the side of the hinge cylinder section 1' of the casing 1. The holder 4 is shaped so as not to be rotatable in the recess 11 about the hinge axis (hinge rotation axis X), with no wobbling gap.

The holder 4 has a lock section or hanger section 41 for a strap to be put through. A through pin hole 42 is formed obliquely with respect to the surface of the casing 1 of substantially flat shape. The casing 1 has an opening 12 and a receptor groove 13 in opposed positions in the recess 11. A lateral groove 14 is formed in connection with the opening 12. An L-shaped pin 5, which functions as a retaining pin of the holder 4, is obliquely inserted through the opening 12, the pin hole 42, and the receptor groove 13. The cover 3 also functions as a retainer of the pin 5 that is fitted to the lateral groove 14 in the casing 1. The casing 1 and the cover 3 are fastened by a screw 6.

The strap holder attaching section of the exemplary embodiment will be described further.

The strap attaching section includes: the recess 11 which is formed in the hinge section (hinge cylinder section) 1' of the casing 1 that constitutes the folding portable apparatus; the strap holder 4 which is accommodated in the recess 11; and a coupling member or coupling means for coupling the strap holder 4 and the hinge section 1'. The coupling member includes: a first pin hole 42 which penetrates through the strap holder 4; a second pin hole 42' which is formed in the hinge section 1'; a groove 10 which is formed in an outer surface of the hinge section; and the L-shaped pin 5. The L-shaped pin 5 is made of a first straight portion 51 and a second straight portion 52 which are orthogonal to each other.

The groove 10 has: a first area (opening) 12 in which one end of the second pin hole 42' opens; and a second area (lateral groove) 14 which communicates with the first area 12 and in which the second portion 52 of the L-shaped pin is placed. The second pin hole 42' communicates with the first area 12 of the groove 10. The first portion 51 of the L-shaped pin extends through the first and second pin holes 42 and 42'. The second portion 52 of the L-shaped pin is placed in the groove 10.

The receptor groove 13, which functions as a pin receptor, is formed in the hinge section 1' on the opposite side from the second pin hole 42' with respect to the strap holder 4. The first portion 51 of the L-shaped pin extends to the receptor groove 13. The receptor groove 13 opens in an outer surface of the hinge section 1'.

The cover 3 is detachably attached to the casing 1 with the screw 6. The cover 3 also covers the openings of the groove 10 and the receptor groove 13 when attached to the casing 1. The cover 3 has a rib 31 in particular, and the rib 31 fits to the receptor groove 13. The rib 31 holds down the end of the first portion 51 of the L-shaped pin which extends to the receptor groove 13. The cover 3 also functions as a retainer of the pin 5 that is fitted to the lateral groove 14 in the casing 1.

The strap holder 4 is accommodated into the recess 11 of the hinge section 1' along the direction of the hinge rotation axis X. The strap holder 4 has a non-circular cross section so as to restrain rotation with respect to the hinge section 1' about the hinge rotation axis X and to eliminate wobbling gaps with respect to the recess 11. The strap holder 4 has the hook lock section or hook hanger section 41 for attaching a strap, the hook lock section 41 being formed on an outer surface (end face) that crosses the hinge rotation axis X when the strap holder 4 is accommodated in the recess 11.

The first portion 51 of the L-shaped pin extends obliquely with respect to the outer surface of the hinge section 1' where the groove 10 is formed (the top surface in FIG. 2).

The first portion 51 of the L-shaped pin 5 can be rotated in the first and second pin holes 42 and 42' about the longitudinal direction of the first portion 51. The rotation makes it possible to take a first state of arrangement where the second portion 52 lies inside the second area 14 of the groove 10 and a second state of arrangement where at least the extremity of the second portion 52 lies outside the groove 10. The second state of arrangement can be taken when the cover 3 is not attached to the casing 1 (such as before assembled for manufacturing, and when disassembled for repair).

Figure 4:
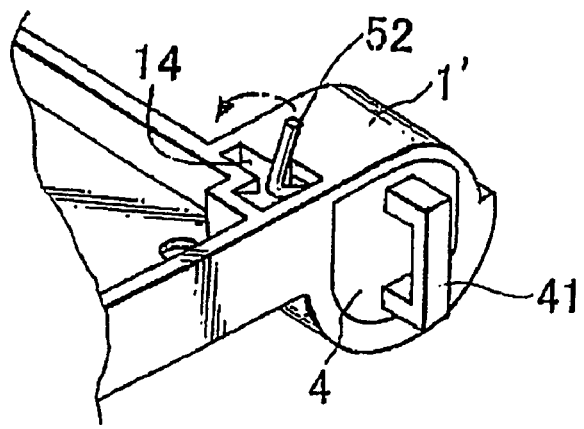
FIG. 4 is an explanatory diagram of steps in an exemplary embodiment of a method of manufacturing the strap attaching section according to the exemplary embodiment of FIG. 1.
Figure 4:
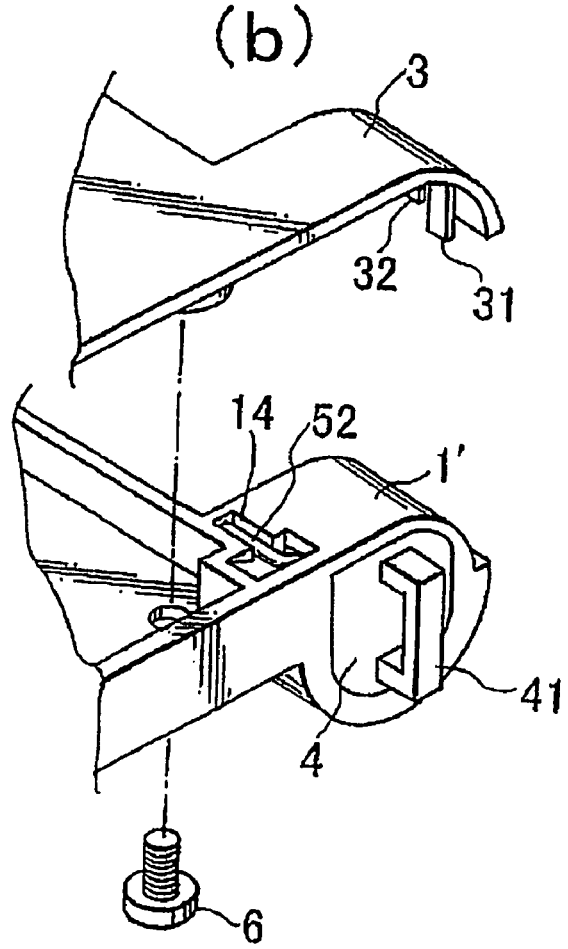

Next, each individual step in an exemplary embodiment of a method of manufacturing the strap attaching section of the folding portable apparatus according to the above exemplary embodiment will be described with reference to FIGS. 2 to 4. FIG. 4 is a diagram showing steps after the insertion of the pin 5, wherein (a) is a diagram showing the state where the pin 5 is inserted, and (b) is a diagram showing the state after the pin 5 is rotated.

The exemplary embodiment relates to a method of assembling the structure of the strap attaching section of the foregoing folding portable apparatus, the method including the steps of: accommodating the strap holder into the recess in the side of the hinge cylinder section of the casing; inserting the L-shaped pin into the opening formed in the casing and the pin hole penetrating through the strap holder so that the L-shape pin is received by the receptor groove formed in the casing; rotating the rear end of the pin so as to be accommodated into the lateral groove; and fastening the cover to the casing.

In FIG. 2, the holder 4 is initially fitted into the recess 11 of the casing 1. Next, the first portion 51 of the pin 5 is obliquely inserted into the opening 12 of the casing 1, passed through the pin hole 42 of the holder 4, and pushed in until the extremity comes into contact with the receptor groove 13 of the casing 1.

In FIG. 4(a), with the pin 5 inserted, the second portion 52 of the pin 5 is rotated in the direction of the arrow shown in the diagram and thereby accommodated into the lateral groove 14 of the casing 1. Next, in FIG. 4(b), a tab 32 of the cover 3 is fitted to the casing 1, and the casing 1 and the cover 3 are fastened by the screw 6. FIG. 3(c) shows the resulting state, in which the second portion 52 of the pin 5 is held down in the lateral groove 14 of the casing 1 by the inner surface of the cover 3, and the extremity of the first portion 51 is held down by the rib 31 of the cover 3, being sandwiched between the rib 31 and the bottom of the receptor groove 13 of the casing 1. The pin 5 is thus restrained from rotation and prevented from coming off without adhesion or press fit for fixing. The holder 4 is thus fixed with reliability.

The method of manufacturing the strap attaching section according to the exemplary embodiment will be described further.

Initially, as shown in FIG. 2, the step of moving the strap holder 4 in the direction of the hinge rotation axis X to accommodate the strap holder 4 into the recess 11 formed in the hinge section 1' of the casing 1 is performed. As a result, the first pin hole 42 of the strap holder 4 is aligned with the second pin hole 42' and receptor groove 13 of the hinge section 1' of the casing.

Next, the step of inserting the first portion 51 of the L-shaped pin into the first and second pin holes 42 and 42' from the side of the groove 10 formed in the outer surface of the hinge section 1' is performed. Here, as shown in FIG. 2, the second portion 52 of the L-shaped pin is maintained non-parallel to the outer surface of the hinge section 1' where the groove 10 is formed (the top surface). This state is the foregoing second state of arrangement where at least the extremity of the second portion 52 of the L-shaped pin lies outside the groove 10. This state facilitates holding the L-shaped pin 5 during the operation of insertion of the L-shaped pin 5.

In the exemplary embodiment, the first portion 51 of the L-shaped pin extends obliquely with respect to the outer surface of the hinge section 1'. The second pin hole 42' can thus be configured to open in the first area 12 of the groove at a position extremely close to the outer surface of the hinge section 1' where the groove 10 is formed. This makes the operation of inserting the L-shaped pin 5 even easier.

Next, as shown in FIG. 4(*a*), the step of rotating the second portion 52 of the L-shaped pin by approximately 90° in the direction of the arrow about the longitudinal direction of the first portion 51 to place the second portion 52 in the groove 10 is performed. Consequently, as shown in FIG. 4(*b*), the second portion 52 is placed in the second area 14 of the groove 10. This state is the foregoing first state of arrangement where the second portion 52 of the L-shaped pin lies inside the second area 14.

Next, the step of detachably attaching the cover 3 to the casing 1 so as to cover the openings of the groove 10 and receptor groove 13 is performed. Here, the recess in the main section of the casing 1 in which the functional units such as the electronic circuits are accommodated is also covered with the cover. At this step, the tab 32 formed on the cover 3 is fitted to a not-shown engaging part formed on the casing 1. The casing 1 and the cover 3 are fastened by the screw 6. The screw 6 can be unscrewed to detach the cover from the casing 1.

The step of detachably attaching the cover 3 to the casing 1 is performed so that the cover 3, or its inner surface in particular, is in contact with a part of the L-shaped pin, or the second portion 52 in particular. At this step, the rib 31 formed on the cover 3 comes into contact with and holds down the end of the first portion 51 of the L-shaped pin which extends to the receptor groove 13. Consequently, the end of the first portion 51 of the L-shaped pin is sandwiched between the rib 31 and the bottom end of the receptor groove 13.

When the cover 3 is detachably attached to the casing 1, the L-shaped pin 5 is thus prevented from moving in the longitudinal direction of the first portion 51. When the cover 3 is detachably attached to the casing 1, the L-shaped pin 5 is also prevented from rotating about the longitudinal direction of the first portion 51. That is, the L-shaped pin 5 is prevented from rotation and coming off without adhesion or press fit for fixing, and the strap holder 4 is thereby fixed to the hinge section 1' of the casing with reliability.

Second Exemplary Embodiment

Figure 5:
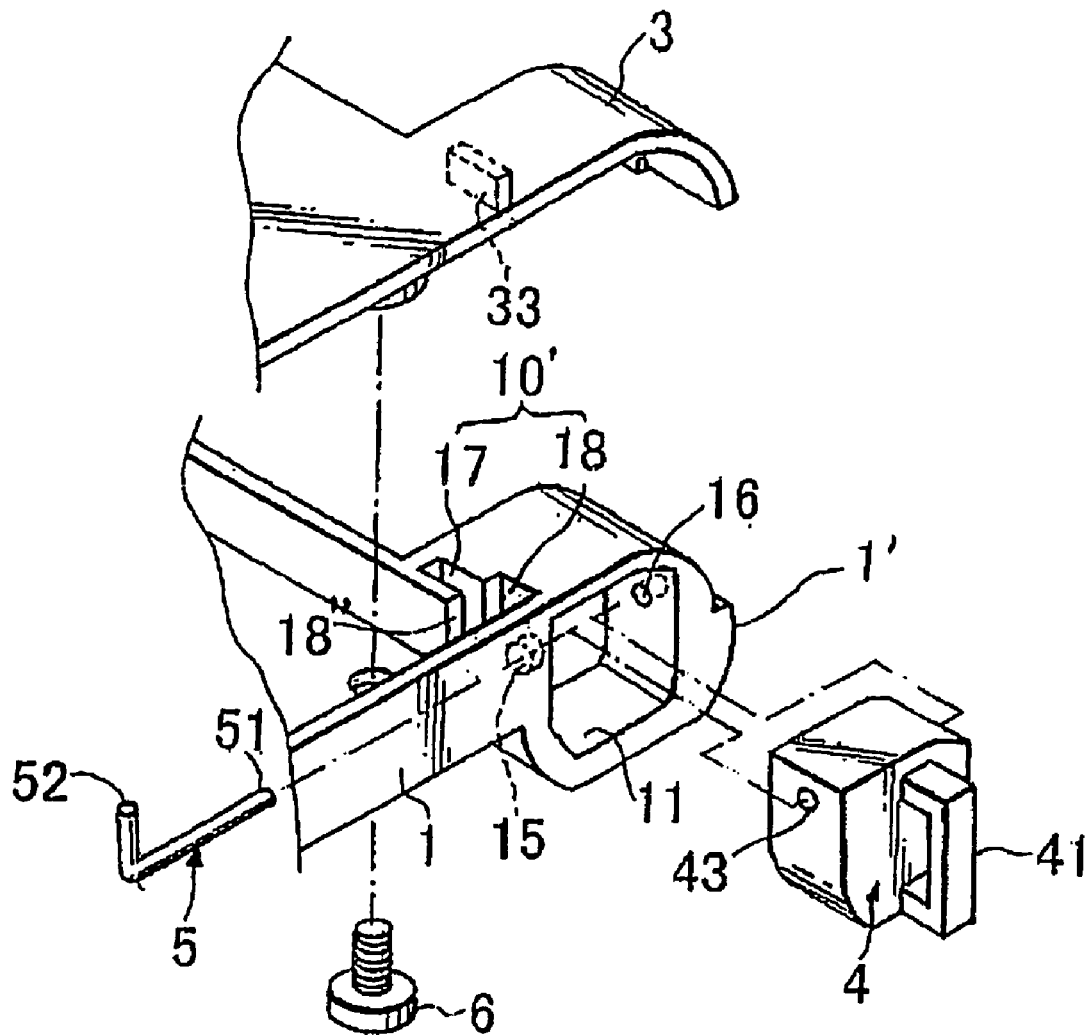
FIG. 5 is an exploded perspective view showing a strap attaching section of a second exemplary embodiment of the folding portable apparatus that has the strap attaching section according to the present invention.
Figure 6:
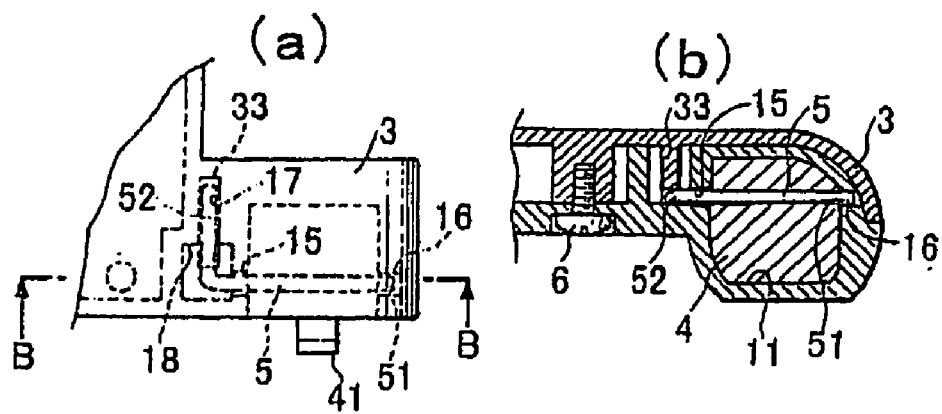
FIG. 6 is a diagram showing how the strap attaching section according to the exemplary embodiment of FIG. 5 is assembled, wherein (a) is a top view, and (b) a cross-sectional view taken along the line B-B of (a)
Figure 7:
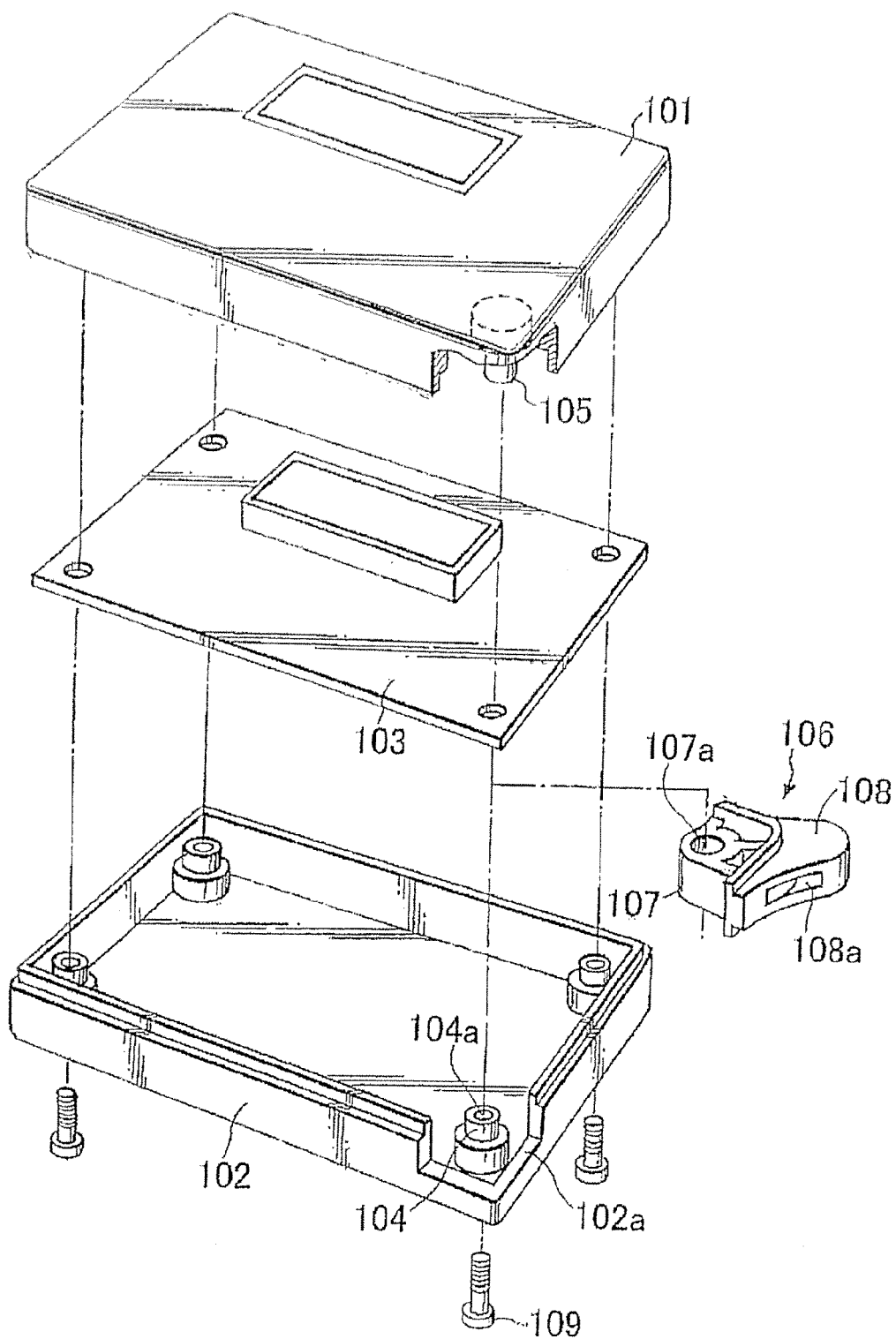
FIG. 7 is a diagram showing a portable apparatus described in Patent Document 1, having a strap holder attached to its casing.

FIG. 5 is an exploded perspective view showing a strap attaching section of a second exemplary embodiment of the folding portable apparatus that has the strap attaching section according to the present invention. FIG. 6 is a diagram showing how the strap attaching section according to the exemplary embodiment is assembled, wherein (a) is a top view, and (b) a cross-sectional view taken along the line B-B of (a). In the diagrams, members having the same functions as those of members shown in FIGS. 1 to 4 are designated by like reference numerals.

The exemplary embodiment relates to the structure of a strap attaching section of a folding portable apparatus, characterized in that: a strap holder is accommodated in a recess in a side of the hinge cylinder section of a casing; an L-shaped pin is inserted through an opening formed in the casing, a pin hole penetrating through the strap holder, and a through hole formed in the casing; and a cover fastened to the casing holds down both sides of the pin to fix the strap holder.

The exemplary embodiment also relates to the structure of the strap attaching section of the folding portable apparatus, characterized in that: the pin is inserted in parallel with a surface of the casing of flat shape; an extremity of the pin is held down by the cover; and a bottom of the pin is fitted into a lateral groove communicating with the opening and is held down by a rib formed on the cover.

The exemplary embodiment also relates to a method of assembling the structure of the strap attaching section of the foregoing folding portable apparatus, the method including the steps of: accommodating the strap holder into the recess in the side of the hinge cylinder section of the casing; inserting the L-shaped pin through the opening formed in the casing, the pin hole penetrating through the strap holder, and the through hole formed in the casing; rotating the rear end of the pin so as to be accommodated in the lateral groove; and fastening the cover to the casing.

In the exemplary embodiment, a through pin hole 43 is formed in parallel with the surface of the casing 1 of substantially flat shape. The casing 1 has an opening 18 and a through hole 16 in opposed positions in the recess 11. A lateral groove 17 and a notch 18" are formed in connection with the opening 18. An L-shaped pin 5, which functions as a retaining pin of the holder 4, is inserted through a pin hole 15, the pin hole 43, and the through hole 16. Here, the pin 5 is inserted in parallel with the surface of the casing 1 from the side of the notch 18". After the extremity of the first portion 51 is put through the through hole 16, the second portion 52 is rotated and accommodated into the lateral groove 17. Here, the lateral groove 17 leaves an internal space above the second portion 52.

The casing 1 and the cover 3 are fastened by a screw 6. A rib 33 of the cover 3 fits to the space inside the lateral groove 17, thereby holding down the second portion 52 of the pin 5 to restrain the pin 5 from rotation. The curved portion of the cover 3 holds down the extremity of first portion 51 of the pin 5 protruding from the through hole 16.

As in the exemplary embodiment 1, the pin 5 is restrained from rotation and prevented from coming off without adhesion or press fit for fixing. As a result, the holder 4 is fixed with reliability. This exemplary embodiment is effective when attaching a holder of lower profile.

The strap attaching section of the exemplary embodiment will be described further.

In the exemplary embodiment, the first portion 51 of the L-shaped pin 5 extends in parallel with the outer surface of the hinge section 1' where the groove 10' is formed. The pin receptor in the hinge section 1' of the casing is formed as a through hole 16 like the second pin hole 15.

The groove 10' has: a first area (opening) 18 in which one end of the second pin hole 15 opens; and a second area (lateral groove) 17 which communicates with the first area 18 and in which the second portion 52 of the L-shaped pin is located. The second pin hole 15 communicates with the first area 18 of the groove 10'. The first portion 51 of the L-shaped pin extends through the first and second pin holes 43 and 15. The second portion 52 of the L-shaped pin is placed in the groove 10'.

In the exemplary embodiment, the first portion 51 of the L-shaped pin extends in parallel with the outer surface of the hinge section 1'. The second pin hole 15 opens in the first area 18 of the groove at a position farther from the outer surface of the hinge section 1' where the groove 10' is formed than the position in the exemplary embodiment 1. For the convenience of the operation of inserting the L-shaped pin 5, as shown in FIG. 5, the wall that defines the first area 18 of the groove is notched to form the notch 18" on an extension of the line that connects the second pin hole 15 and the through hole 16 of the hinge section 1' of the casing.

In the exemplary embodiment, when performing the step of inserting the first portion 51 of the L-shaped pin 5 into the first and second pin holes 43 and 15 and the pin-receptor through hole 16 from the side of the groove 10' formed in the outer surface of the hinge section 1', the second portion 52 of the L-shaped pin 5 passes through the notch 18" in the wall of the first area 18 of the groove. The second portion 52 of the L-shaped pin 5 is then rotated by approximately 90° about the longitudinal direction of the first portion 51 as in the exemplary embodiment 1, whereby the second portion 52 is placed in the second area 17 of the groove 10'.

In the exemplary embodiment, the second portion 52 of the L-shaped pin 5 placed in the second area 17 of the groove 10' lies in a position away from the outer surface of the hinge section 1'. To hold down the second portion 52, the rib 33 is formed on the inner surface of the cover 3 at the position corresponding to the second area 17 of the groove 10'. The extremity of the first portion 51 of the L-shaped pin 5 is in contact with the inner surface of the cover 3.

When the cover 3 is detachably attached to the casing 1, the L-shaped pin 5 is thus prevented from moving in the longitudinal direction of the first portion 51. When the cover 3 is detachably attached to the casing 1, the L-shaped pin 5 is also prevented from rotating about the longitudinal direction of the first portion 51. That is, the pin 5 is prevented from rotation and coming off without adhesion or press fit for fixing, and the strap holder 4 is thereby fixed to the hinge section 1' of the casing with reliability. This exemplary embodiment is effective when attaching a strap holder 4 of lower profile.

In the foregoing exemplary embodiments, the L-shaped pin inserted through the strap holder and the casing is held down at both sides by the cover, so that the pin is restrained from rotation and prevented from coming off across a wide area. The strap holder can thus be fixed with reliability to achieve the strap attaching section of compact and firm structure.

Since the pin of L shape is easy to hold and requires no adhesion or press fit for fixing, it allows easy assembly with reduced manufacturing cost and equipment cost.

The absence of adhesion or press fit for fixing also makes it possible to remove the pin and replace only the holder easily on such occasions as when the strap attaching section is broken. This allows reuse of the casing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention.

This application is based upon and claims the benefit of priority from Japanese Patent Application No. 2007-28056, filed with Japan Patent Office on Feb. 7, 2007, the entire contents of which are incorporated herein by reference.

INDUSTRIAL APPLICABILITY

The present invention may be used not only for folding portable electronic apparatuses such as a folding cellular phone, but also for other folding portable apparatuses. In particular, the present invention may be utilized to attach all kinds of accessories such as hooks, hinge units, and various cover caps to a casing. Such accessory attaching holders should also be covered by the strap holder of the present invention.

LIST OF REFERENCE SIGNS IN THE DRAWINGS

1: Casing
1': Hinge section of casing
2: Another casing
3: Cover
4: Strap holder
5: L-shaped pin
6: Screw
10, 10': Groove
11: Recess
12, 18: First area of groove (Opening)
13: Receptor groove
14, 17: Second area of groove (Lateral groove)
15 42': Second pin hole
16: Through hole
18": Notch
31, 33: Rib
32: Tab
41: Hook lock section
42 43: First pin hole
51: First portion of L-shaped pin
52: Second portion of L-shaped pin
X: Hinge rotation axis

What is claimed is:

1. A strap attaching section of a folding portable apparatus, comprising:
   a recess formed in a hinge section of a casing that constitutes the folding portable apparatus;
   a strap holder accommodated in the recess;
   a coupling member for coupling the strap holder and the hinge section, wherein the coupling member includes:
      a first pin hole penetrating through the strap holder;
      a second pin hole formed in the hinge section;
      a groove formed in an outer surface of the hinge section; and
      an L-shaped pin,
         wherein the second pin hole communicates with the groove, a first portion of the L-shaped pin extends through the first and second pin holes, and a second portion of the L-shaped pin is placed in the groove; and
   a cover for covering the groove is detachably attached to the casing,
   wherein the groove comprises a first area in which one end of the second pin hole opens and a second area that communicates with the first area and in which the second portion of the L-shaped pin is placed, and
   wherein the cover is attached to the as n so that an inner surface of the cover is in contact with the second portion of the L-shaped pin, whereby the L-shaped pin is prevented from rotating about a longitudinal direction of the first portion of the L-shaped pin.

2. The strap attaching section according to claim 1, wherein the first portion of the L-shaped pin is capable of rotation in the first and second pin holes about the longitudinal direction of the first portion, and the rotation allows the L-shaped pin to take a first state of arrangement where the second portion lies inside the groove and a second state of arrangement where at least an extremity of the second portion lies outside the groove.

3. The strap attaching section according to claim 2, wherein the first portion of the L-shaped pin extends obliquely with respect to the outer surface of the hinge section where the groove is formed.

4. The strap attaching section according to claim 2, wherein the first portion of the L-shaped pin extends in parallel with the outer surface of the hinge section where the groove is formed.

5. The strap attaching section according to claim 1, wherein the first portion of the L-shaped pin extends obliquely with respect to the outer surface of the hinge section where the groove is formed.

6. The strap attaching section according to claim 1, wherein the first portion of the L-shaped pin extends in parallel with the outer surface of the hinge section where the groove is formed.

7. The strap attaching section according to claim 1, wherein the cover has a rib that holds down the second portion of the L-shaped pin in the groove.

8. The strap attaching section according to claim 1, wherein the hinge section has a pin receptor part formed on an opposite side from the second pin hole with respect to the strap holder, and the first portion of the L-shaped pin extends to the pin receptor part.

9. The strap attaching section according to claim 8, wherein the pin receptor part opens in an outer surface of the hinge section.

10. The strap attaching section according to claim 9, wherein the cover has a rib that holds do n an end of the first portion of the L-shaped pin extending to the pin receptor part.

11. The strap attaching section according to claim 1, wherein the strap holder is accommodated into the recess of the hinge section along a direction of a hinge rotation axis.

12. The strap attaching section according to claim 11, wherein the strap holder is shaped so that rotation of the strap holder about the hinge rotation axis with respect to the hinge section is restricted.

13. The strap attaching section according to claim 11, wherein the strap holder has a hook lock section for attaching a strap, the hook lock section being formed on an outer surface that crosses the hinge rotation axis when the strap holder is accommodated in the recess.

14. A folding portable electronic apparatus comprising:
the strap attaching section according to claim 1; and
another casing to be hinge-coupled with the casing.

15. The strap attaching section according to claim 1, wherein the cover holds down both ends of the L-shaped pin.

16. The strap attaching section according to claim 1, further comprising a lateral groove,
wherein a bottom portion of the L-shaped pin is fitted into the lateral groove.

17. The strap attaching section according to claim 1, wherein the strap holder is fitted within the recess such that the strap holder is prevented from rotating within the recess.

18. The strap attaching section according to claim 1, wherein the strap holder is fitted within the recess against an inner surface of the hinge section without a gap between the strap holder and the inner surface of the hinge section.

19. A method of manufacturing a strap attaching section of a folding portable apparatus, the method comprising:
providing the folding portable apparatus according to claim 1 accommodating the strap holder into the recess formed in the hinge section of the casing;
inserting the first portion of the L-shaped pin into the first and second pin holes from the groove formed in the outer surface of the hinge section;
rotating the second portion of the L-shaped pin about a longitudinal direction of the first portion to place the second portion in the groove; and
detachably attaching the cover to the casing so as to cover the groove so that the inner surface of the cover is in contact with the second portion of the L-shaped pin, whereby the L-shaped pin is prevented from rotating about the longitudinal direction of the first portion of the L-shaped pin.

20. The method of manufacturing the strap attaching section according to claim 19, wherein the cover is detachably attached to the casing so that the L-shaped pin is prevented from moving in the longitudinal direction of the first portion.

* * * * *